(No Model.)
C. W. CRONK.
TELESCOPIC CUT-OFF VALVE GEAR.
No. 376,516. Patented Jan. 17, 1888.
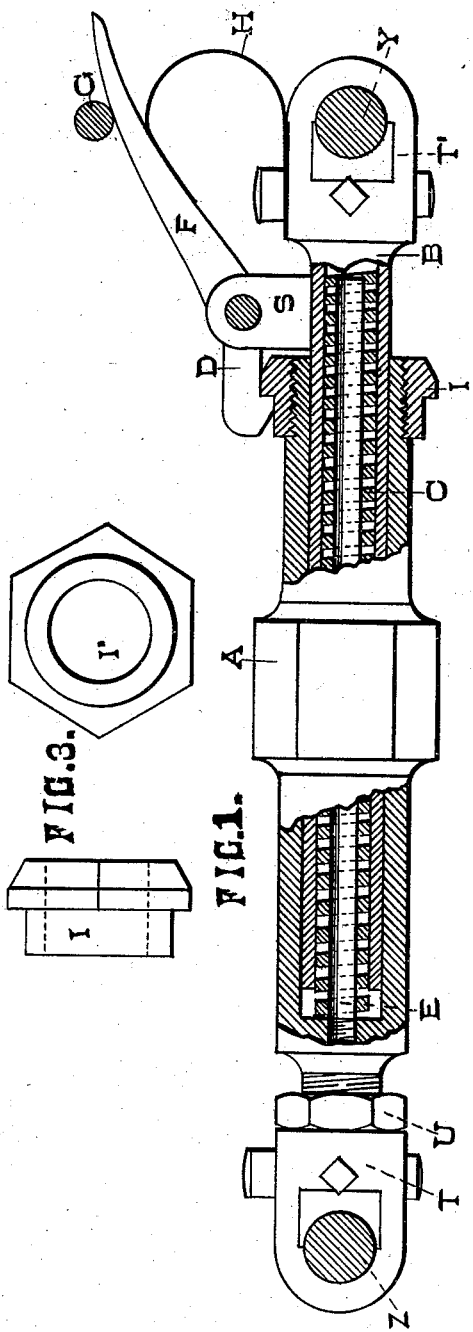
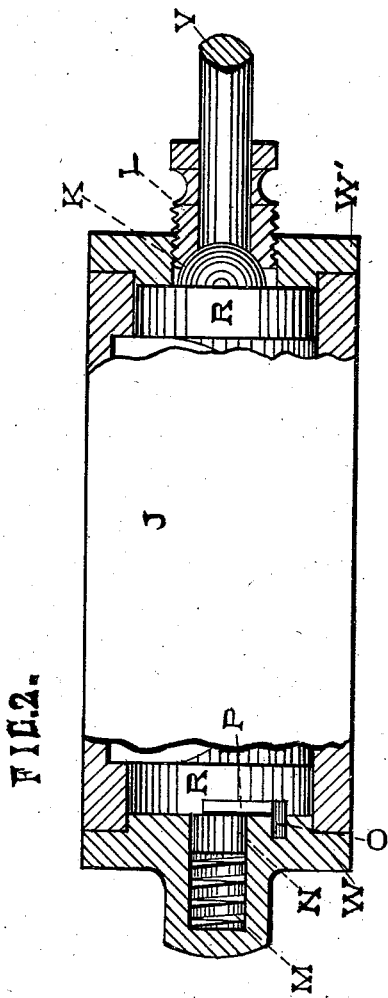
WITNESSES.
Percy B. Taylor
Lewis F. Cronk
INVENTOR.
Chas. W. Cronk.

UNITED STATES PATENT OFFICE.

CHARLES W. CRONK, OF NEWARK, NEW JERSEY.

TELESCOPIC CUT-OFF-VALVE GEAR.

SPECIFICATION forming part of Letters Patent No. 376,516, dated January 17, 1888.

Application filed May 14, 1887. Serial No. 238,294. (No model.)

*To all whom it may concern:*

Be it known that I, CHARLES W. CRONK, a citizen of the United States, residing at Newark, county of Essex, State of New Jersey, have invented certain new and useful Improvements in the Cut-Off-Valve Gears of Steam-Engines, which invention is fully set forth and illustrated in the following specification and drawings.

The object of my invention is to provide a simple release and closing motion for semi-rotary plug-valves, and the agent which determines the time of release may be a governor or some device adjustable by hand. With my device the shock upon the governor and pin connections incident to the use of crab-claws and other claws and devices is avoided by having greater leverage on the latch-bar, and I am able to dispense with the resisting dash-pots, weights, and appliances so common at present, obtaining better regulation of speed and the work of unhooking reduced to a minimum. I am also enabled to effect an early exhaust-closure, if desired, for cushioning, as the improvement can be attached to the exhaust-valves with equal facility and released by a fixed device. To provide for freedom from wear and friction in packing on valve-stems and enable my closing motion to work freely, I show in the accompanying drawings a device which is dependent on the other and mutually contributes to produce a single result.

I am aware that a so-called "self-packing" device has been patented consisting of a steel collar shrunk on the valve-stem and held up to its seat by steam-pressure; but it is questionable. The closed bonnets accompanying it conceal from the engineer the true condition of his packing, and it is a common thing to find a stream of water running from the catch-all pipes under the floor, which interpreted into steam may easily mean a constant waste of one or two horse power. This form of packing is an especial annoyance on the exhaust-valves of a condensing-engine, since the collar will inevitably suck from its seat and impair the vacuum.

In my device a half-ball is cast on valve-stems next to blade and a gland having a fine thread for adjustment and fitted socket shape on end and ground steam-tight, forming a ball-and-socket joint adjustable as it wears by the spiral spring in the back bonnet furnishing the thrust, keeping the joint tight under all conditions. By dispensing with dash-pots, weights, and other appliances at present in use all wear and strain on valve-stems is avoided, and I effect a considerable item in economy of first cost—equal to seven per cent.; and this improvement can be attached to all existing engines at a small expense.

My method of construction will be understood from the annexed drawings, in which—

Figure 1 is in part a sectional side view, and Fig. 2 a cross-section, of valve-chest, and Fig. 3 illustrates in two views a steel nut with hexagon sides forming latch-plates or dies.

A, Fig. 1, illustrates a telescopic sleeve, one end screwed to stub T and locked by nut U for adjustment, and bored to fit plunger B. Screwed to the open end is a steel nut, I, with hexagon sides forming plates or dies for latch D to engage (shown more fully in Fig. 3) I and I', which plates, being prevented by their easy adjustment to wear, are practically indestructible during the life-time of an engine. Screwed in the shank is a guide-rod, E, that carries a spiral spring, C.

B is a hollow plunger turned to fit sleeve A, carrying a lug, S, to fulcrum the latch-bar F and bored to fit spiral spring C.

G is a toe or pin actuated by governor-connection, or in a fixed position for either steam or exhaust valves.

H is a spring secured to stub T' for closing latch.

T is a stub to connect with pin Z to rock-shaft or wrist-plate; T', stub of plunger to connect with pin Y with valve. C is a spiral spring to close valve after release at D.

In Fig. 2, J represents steam box or chest of semi-rotary or plug valve broken at ends, R being the valve, and V the valve-stem. L represents a gland screwed in bonnet W'. K is a half-ball, which, with the socket end of L, forms a ball-and-socket joint. P represents a slot cut in end of valve to travel on pin O. N is a back end of valve-stem V. M is a spiral spring furnishing thrust for joint K and L.

The operation is as follows: By the movement of eccentric latch-bar F is brought in contact with G, which depresses the bar F and disengages latch D, when the valve is instantly closed by spring C, and is stopped by pin O in slot P of valve R. No rebound is possible, as the action of spring is constant throughout the length of stroke, and great freedom is obtained by avoiding packing on stems.

Having described my invention so that others may follow, I claim the same as follows:

1. The combination, in a telescopic cut-off motion for releasing and closing oscillating plug-valves of steam-engines, of the sleeve A, provided with a spring-guide, E, stub T, and hexagonal nut I, with latch-dies forming the sides, substantially as described.

2. The combination, in a telescopic cut-off motion for releasing and closing oscillating plug-valves of steam-engines, of the plunger B, provided with a spiral spring, C, lug S, latch-bar F, stub T', and latch-spring H, substantially as described.

3. The combination, in a telescopic cut-off motion for releasing and closing oscillating plug-valves of steam-engines, of plunger B, ball-and-socket joint K and L, spiral spring M, slot P, and stop-pin O, substantially as described.

4. The combination, in a telescopic cut-off motion for releasing and closing oscillating plug-valves of steam-engines, of the sleeve A, plunger B, spring C, latch-spring H, spring-guide E, hexagonal nut I, ball-and-socket joint K and L, stop-pin O and slot P, and spring M, substantially as and for the purposes described.

CHAS. W. CRONK.

Witnesses:
　PERCY B. TAYLOR,
　LEWIS F. CRONK.